United States Patent
Sargent, III

(10) Patent No.: US 9,918,591 B2
(45) Date of Patent: Mar. 20, 2018

(54) APPARATUS FOR DRAINING EXCESS FLUIDS FROM FOOD

(76) Inventor: Jim Wallace Sargent, III, Florence, AL (US)

( * ) Notice: Subject to any disclaimer, the term of this patent is extended or adjusted under 35 U.S.C. 154(b) by 583 days.

(21) Appl. No.: 12/840,734

(22) Filed: Jul. 21, 2010

(65) Prior Publication Data

US 2012/0017775 A1    Jan. 26, 2012

(51) Int. Cl.
*A47J 43/00* (2006.01)
*A47J 43/28* (2006.01)

(52) U.S. Cl.
CPC ............. *A47J 43/285* (2013.01); *A47J 43/28* (2013.01); *A47J 43/00* (2013.01)

(58) Field of Classification Search
CPC .................................. A47J 43/28; A47J 43/00
USPC ......... 99/425, 495, 504, 505, 506, 507, 453; 100/110, 116, 213, 234; D7/666, 687; 294/3, 7, 8, 8.5, 9–11, 33, 99.2; 30/123, 30/148–150; 7/109–110, 113
See application file for complete search history.

(56) References Cited

U.S. PATENT DOCUMENTS

| | | | | | |
|---|---|---|---|---|---|
| 1,484,100 | A | * | 2/1924 | Wertz | 294/119 |
| 1,643,456 | A | * | 9/1927 | James | 30/324 |
| 1,723,597 | A | * | 8/1929 | Bannister | 294/106 |
| 2,455,623 | A | * | 12/1948 | Stone | 30/123 |
| 2,573,922 | A | * | 11/1951 | Meyer | 294/7 |
| D168,289 | S | * | 12/1952 | David | D7/687 |
| 2,881,022 | A | * | 4/1959 | Brust | 294/25 |
| 2,887,948 | A | * | 5/1959 | Kramer et al. | 100/213 |
| 2,891,814 | A | * | 6/1959 | Idoine et al. | 294/99.2 |
| 3,356,405 | A | * | 12/1967 | Gruber | 294/3 |
| 3,761,120 | A | * | 9/1973 | Binkert | 294/8 |
| 3,817,163 | A | * | 6/1974 | Kizziar et al. | 99/353 |
| 3,964,775 | A | * | 6/1976 | Boyd | 294/16 |
| 4,002,365 | A | * | 1/1977 | Rader | 294/8 |
| 4,355,574 | A | * | 10/1982 | Bond et al. | 100/234 |
| 4,577,900 | A | * | 3/1986 | Chasen | 294/118 |
| 4,580,909 | A | * | 4/1986 | McIntosh | 374/141 |
| D291,763 | S | * | 9/1987 | Dunn et al. | D7/687 |
| 4,753,472 | A | * | 6/1988 | Fout | 294/32 |
| 4,904,009 | A | * | 2/1990 | Kozlinski | 294/7 |
| 5,054,835 | A | * | 10/1991 | Loechel et al. | 294/99.2 |
| 5,076,628 | A | * | 12/1991 | Rader | 294/8 |
| D326,592 | S | * | 6/1992 | Denton | D7/674 |
| 5,152,213 | A | * | 10/1992 | Masumoto et al. | 99/495 |
| 5,335,591 | A | * | 8/1994 | Pozar | 100/116 |
| 5,403,052 | A | * | 4/1995 | Lampron | 294/7 |

(Continued)

*Primary Examiner* — Reginald L Alexander
(74) *Attorney, Agent, or Firm* — Ariel S. Bentolila; Bay Area IP Group, LLC

(57) ABSTRACT

An apparatus includes a spatula surface having a plurality of holes. The spatula surface is configured for handling food during a cooking process and for enabling fluids to drain through the holes. An arm supports the spatula surface during the cooking process. A handle is joined to an end of the arm. A drainer is positioned generally horizontally above a top surface of the spatula surface for contacting food positioned between the spatula surface and the drainer, and for enabling a pressure to be applied to the food to substantially remove excess fluids from the food. Attaching bars support the drainer and enable movement of the drainer relative to the spatula surface. A lever is joined to the attaching bars for enabling a user to impart a relative downward movement of the drainer to apply the pressure to the food, thereby enabling the user to substantially drain the excess fluids.

14 Claims, 1 Drawing Sheet

(56) References Cited

U.S. PATENT DOCUMENTS

| | | | | |
|---|---|---|---|---|
| 5,447,351 | A | * | 9/1995 | Klunder .................. 294/99.2 |
| 5,551,741 | A | * | 9/1996 | LaBoccetta .................. 294/7 |
| 5,601,323 | A | * | 2/1997 | Kaiser .................. 294/7 |
| 5,634,719 | A | * | 6/1997 | La Neve .................. 374/141 |
| 5,826,502 | A | * | 10/1998 | Wade .................. 100/234 |
| 5,934,721 | A | * | 8/1999 | Walde .................. 294/3 |
| 6,092,460 | A | * | 7/2000 | Engelhardt .................. 99/495 |
| D433,289 | S | * | 11/2000 | Durbin et al. .................. D7/666 |
| 6,217,092 | B1 | * | 4/2001 | Spicker .................. 294/16 |
| D457,789 | S | * | 5/2002 | Rowe et al. .................. D7/686 |
| D477,189 | S | * | 7/2003 | Bull et al. .................. D7/686 |
| 6,682,112 | B2 | * | 1/2004 | Neal et al. .................. 294/7 |
| 6,712,505 | B2 | * | 3/2004 | Chapman et al. .................. 374/155 |
| 6,726,263 | B2 | * | 4/2004 | Wang et al. .................. 294/16 |
| D491,028 | S | * | 6/2004 | Claypool et al. .................. D7/686 |
| D502,367 | S | * | 3/2005 | Claypool et al. .................. D7/686 |
| D512,608 | S | * | 12/2005 | Gutierrez .................. D7/666 |
| 7,086,676 | B2 | * | 8/2006 | Sumter et al. .................. 294/16 |
| D535,853 | S | * | 1/2007 | Zemel .................. D7/393 |
| 7,249,793 | B1 | * | 7/2007 | Jabr .................. 294/16 |
| 7,258,063 | B2 | * | 8/2007 | Kiplinger et al. .................. 99/426 |
| D557,084 | S | * | 12/2007 | Yamanaka et al. .................. D7/686 |
| D570,165 | S | * | 6/2008 | Caucci .................. D7/666 |
| 7,409,764 | B2 | * | 8/2008 | Akopyan .................. 30/114 |
| D607,287 | S | * | 1/2010 | Beasley et al. .................. D7/687 |
| 2001/0045753 | A1 | * | 11/2001 | Lewis .................. 294/3 |
| 2004/0026939 | A1 | * | 2/2004 | Jordan et al. .................. 294/3 |
| 2005/0138736 | A1 | * | 6/2005 | Tarlow .................. 7/110 |
| 2008/0030034 | A1 | * | 2/2008 | Balaciano .................. 294/3 |
| 2008/0289511 | A1 | * | 11/2008 | Mendez .................. 99/357 |
| 2009/0031519 | A1 | * | 2/2009 | Carpenter .................. 15/236.01 |
| 2009/0193981 | A1 | * | 8/2009 | Webb .................. 99/508 |

\* cited by examiner

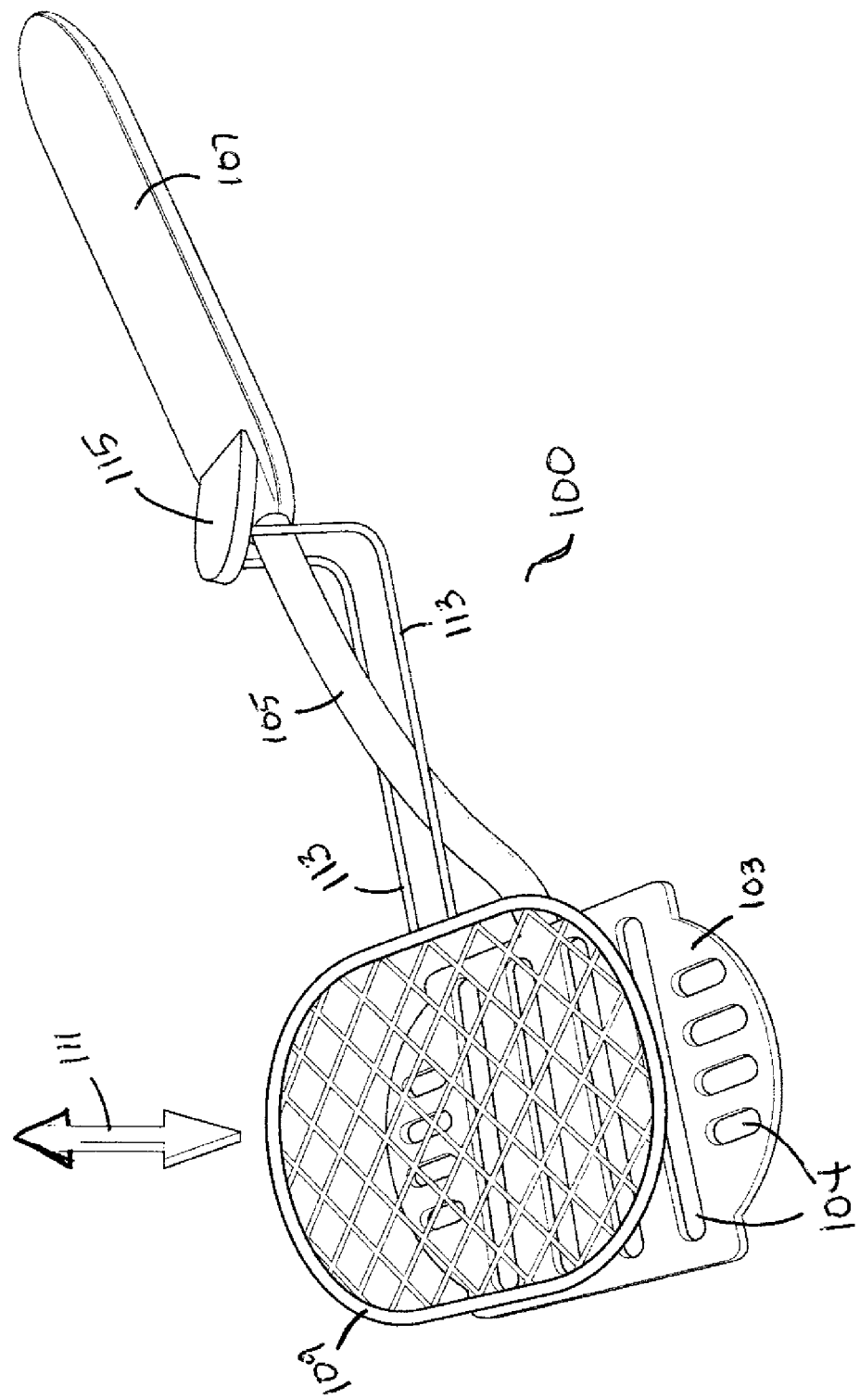

APPARATUS FOR DRAINING EXCESS FLUIDS FROM FOOD

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to cooking utensils. More particularly, the invention relates to a spatula that aids in draining oil, fat and grease from food.

BACKGROUND OF THE INVENTION

Pan-flying is a popular method of cooking many types of foods such as, but not limited to, sausage, bacon, hamburgers, pork chops, eggs, sandwiches, vegetables, etc. However, this cooking method often leaves excess oil, fat or grease on the food. This excess oil, fat and grease can cause the food to be less healthy and may also affect the taste of the food. It is therefore an objective of the present invention to provide means for draining excess oil, grease and fat from pan-fried foods.

Spatulas are often used in pan-frying to turn the food and remove the food from the pan. A majority of spatulas are made up of a metal or plastic flat spatula surface on an extended arm or bar with a handle and are only designed to lift foods from the frying pan surface. Most spatulas are designed with cut out grooves or slots in the spatula surface for allowing excess oil, fat or grease to drain from the fried foods. However, at best, only a minimal amount of oil, fat or grease drains naturally from the food without applying any pressure. After removing fried food from a pan, many people place the food on a plate topped with paper towels, paper sacks or napkins to help absorb some of the excess oil, fat or grease from the fried food. However, this method only absorbs oil, fat or grease from one side of the fried food unless the fried food is manually turned to absorb the oil, fat or grease from the opposite side. Furthermore, unless pressure is applied to the food, only the surface oil, fat or grease from the fried food is absorbed. Some people apply pressure to the food with a paper towel, paper sack or napkin by using their hands or fingers to help drain additional oil, fat or grease. However, this method can result in burns to the hand or fingers from the hot oil, fat or grease and can leave paper residue on the food.

In view of the foregoing, there is a need for improved techniques for providing means for draining excess oil, fat or grease from fried foods that protects a user's hands from burns and removes more than just the surface oil, fat or grease.

BRIEF DESCRIPTION OF THE DRAWINGS

The present invention is illustrated by way of example, and not by way of limitation, in the FIGURES of the accompanying drawings and in which like reference numerals refer to similar elements and in which:

FIG. 1 is a side perspective view of an exemplary fat draining spatula, in accordance with an embodiment of the present invention.

Unless otherwise indicated illustrations in the figures are not necessarily drawn to scale.

DETAILED DESCRIPTION OF THE PREFERRED EMBODIMENTS

The present invention is best understood by reference to the detailed FIGURES and description set forth herein.

Embodiments of the invention are discussed below with reference to the FIGURE. However, those skilled in the art will readily appreciate that the detailed description given herein with respect to these FIGURES is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

A preferred embodiment of the present invention and at least some variations thereof provide a spatula comprising a grid or wire mesh drainer that lies horizontally on top of the spatula and is capable of mechanical up and down movements. In this particular embodiment, the drainer is used to squeeze and help drain excess oil, fat or grease from fried foods such as, but not limited to, sausage, bacon, hamburgers, pork chops, fried chicken, boneless chicken tenders, eggs, etc.

FIG. 1 is a side perspective view of an exemplary fat draining spatula 100, in accordance with an embodiment of the present invention. In the present embodiment, spatula 100 comprises a flat spatula surface 103 with cut out slots 104 on an extended arm 105 with a handle 107 as in a typical spatula. However, spatula 100 also comprises a grid-like drainer 109 that lies horizontally on top of spatula surface 103. Drainer 109 is mechanically designed to adjust up and down as indicated by an arrow 111 in order to exert pressure on variously sized fried foods. The pressure exerted on the fried food causes excess oil, fat or grease to be drained from the top, bottom and sides of the food and forces excess oil, fat or grease from inside the food as opposed to only draining it from the surface of the food. Spatula 100 may be made from a variety of materials including, but not limited to, metals, plastics, stoneware, wood, foam, etc., and in some embodiments, the spatula may be made of a combination of different materials. Drainer 109 may be the same size, smaller or larger than spatula surface 103. The shapes of the spatula surface and the drainer can vary greatly in alternate embodiments from standard square and rectangular shapes to round, oval, oblong or curved shapes. Also, the pattern of the drainer and the cut out slots in the spatula surface for draining the excess oil, fat or grease from the fried foods when pressure is applied may vary in alternate embodiments. For example, without limitation, the spatula surface may comprise multiple round holes or grooves rather than oblong slots, and the drainer may comprise holes of various shapes, slots, groves, or wire or plastic mesh rather than a grid. In one alternate embodiment the drainer comprises a metal or plastic frame with cheesecloth stretched taut over this frame. The cheesecloth in this embodiment is tight enough that it can exert enough pressure on the food to drain the excess oil, fat or grease yet is soft so it does not crush the food. This embodiment may be useful when cooking delicate foods such as, but not limited to, fish, crispy fried chicken, crispy bacon, etc.

In the present embodiment, the mechanical up and down movements of drainer 109 are achieved by attaching bars 113 to drainer 109 that connect to a lever 115 near handle 107. Bars 113 move independently from arm 105. In alternate embodiments the drainer may be connected to the spatula handle with only one bar or more than two bars. In the present embodiment, pushing down on lever 115 causes drainer 109 to move down toward spatula surface 103 to a closed position and releasing lever 115 causes drainer 109 to move away from spatula surface 103 to an open position. A coil or tension spring is placed under lever 115 to enable drainer 109 to return to the open position when lever 115 is released. In alternate embodiments the lever and/or springs may be located in a variety of different locations on the arm or handle of the spatula for example, without limitation, on top of or under the handle or bar. In other alternate embodiments the up and down movement used to separate the spatula surface and the drainer grid and for applying pressure to fried foods can be controlled by a variety of different methods including, but not limited to, a thumb-notch, a trigger, a finger-grip, etc. and may be on top of or under the handle or arm of the spatula or on the bars of the drainer. In some alternate embodiments, the bars of the drainer and the arm of the spatula may be connected by a hinge to form a scissor-like mechanism to enable the drainer and the spatula surface to move toward and away from each other. In yet other alternate embodiments, the up and down motion between the spatula surface and the drainer may also be accomplished using a variety of hydraulics or battery operated mechanisms.

In typical use of the present embodiment, a user cooks food as usual in a pan. The user can use spatula 100 to move the food around the pan and to turn the food. Once the food is cooked, the user slides spatula surface 103 under the food and lifts it from the surface of the pan. Then, the user presses lever 115 to lower drainer 109 onto the food to exert pressure on the food. This pressure forces excess oil, fat or grease from the food, and not only from the surface of the food but also from inside the food. The excess oil, fat or grease escapes through slots 104 in spatula surface 103 and the holes in drainer 109 to fall back into the pan. The user may gently shake spatula 100 while draining the food to remove even more oil, fat or grease. Once the oil, fat or grease is sufficiently removed, the user releases lever 115 and drainer 109 moves away from the food so the food can be slid off of spatula surface 103 onto a serving dish or cutting board. Spatula 100 can also aid the user when turning the food during cooking. The user can lightly squeeze drainer 109 onto the food using lever 115 to hold the food on spatula surface 103 when turning and then release lever 115 and drainer 109 to enable the food to slide back into the pan once turned. Spatula 100 can be used by any individual concerned about excess fat in their diet due to excess oil, fat and grease in fried foods. Those skilled in the art will readily recognize, in accordance with the teachings of the present invention, that any of the foregoing steps may be suitably replaced, reordered, or removed and additional steps may be inserted depending upon the needs of the particular application. For example, without limitation, the user may drain the food multiple times during the cooking process or may drain the excess oil, fat or grease into a separate container rather than back into the pan.

In alternate embodiments drainers for removing excess oil, fat or grease from fried foods may be added to utensils other than spatulas such as, but not limited to, slotted spoons, strainers, skimmers, fish turners, offset spatulas, etc. Another alternate embodiment comprises two drainers connected together in a fashion that enables the drainers to move away from and toward each other rather than a drainer attached to a cooking utensil. In yet another alternate embodiment, the drainer may comprise a multiplicity of spikes or nubs that pierce the food when the drainer is pressed down onto the food. Piercing the food enables more of the excess oil, fat and grease inside the food to escape.

Having fully described at least one embodiment of the present invention, other equivalent or alternative methods of providing means for draining fried foods according to the present invention will be apparent to those skilled in the art. The invention has been described above by way of illustration, and the specific embodiments disclosed are not intended to limit the invention to the particular forms disclosed. For example, the particular implementation of the drainer may vary depending upon the particular type of food being cooked. The drainers described in the foregoing were directed to flat implementations; however, similar techniques are to provide drainers of various different shapes, such as, but not limited to curved drainers, cupped drainers, slanted drainers, wavy drainers, etc. For example, without limitation, one embodiment may comprise a curved drainer to accommodate larger food such as, but not limited to, fried chicken or large hamburgers, and in another embodiment cupped drainers may be used when cooking smaller food such as, but not limited to, ground meats or vegetables to hold the food on the spatula surface while draining. Implementations of the present invention that do not comprise flat drainers are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An apparatus comprising:
a spatula surface portion, wherein said spatula surface having a plurality of holes, in which said spatula surface being configured for handling food during a cooking process and for substantially enabling fluids to drain through said holes;
a spatula arm portion, said spatula arm comprising at least one spatula arm, wherein said spatula arm extends from said spatula surface and configured to substantially support said spatula surface, in which said spatula arm having a generally curved shape at an approximately raised position relative to said spatula surface;
a handle portion, said handle portion comprising at least one handle, wherein said handle extends from said spatula arm and disposed at a distal end portion of said spatula arm, in which said handle is configured to enable a user to relatively move said spatula surface to engage food during the cooking process;
a drainer segment, wherein said drainer segment is generally disposed approximately across said spatula surface for contacting food generally positioned between said spatula surface and said drainer, in which said drainer is configured to apply a pressure to the food;
an attaching bar segment, wherein said attaching bar segment comprising at least two bar segments extending to, and coupled with, said drainer, and wherein said spatula arm is disposed proximate a middle portion of said at least two bar segments, in which said at least two bar segment is configured to substantially prevent a relatively sideways movement of said spatula arm, thereby preventing a sideways movement of said drainer relative to said spatula surface; and
a lever, said lever comprising at least one lever, wherein said lever is disposed at a proximate end portion of said attaching bar, in which said lever is coupled proximate a distal end section of said handle, and in which said lever is configured to enable a user to substantially impart a relative downward movement of said drainer.

2. The apparatus as recited in claim 1, further comprising means for retaining said drainer in an open position relative to said spatula arm, and for returning the drainer to the open position from said downward movement of said drainer.

3. The apparatus as recited in claim 1, wherein a downward pressure applied to said lever is configured to impart said downward movement.

4. The apparatus as recited in claim 1, wherein said spatula surface further comprising a generally flat surface.

5. The apparatus as recited in claim 1, wherein said spatula surface further comprising a generally rectangular surface.

6. The apparatus as recited in claim 1, wherein said drainer comprises a grid pattern for contacting food.

7. The apparatus as recited in claim 1, wherein said drainer and said spatula surface have similar dimensions.

8. The apparatus as recited in claim 1, wherein said spatula surface comprising a straight front edge.

9. The apparatus as recited in claim 8, wherein said spatula surface comprising curved left and right edges.

10. The apparatus as recited in claim 9, wherein said drainer comprising curved left and right edges configured to approximately match curved edges of said spatula surface.

11. The apparatus as recited in claim 1, wherein said holes of said spatula surface comprise oblong slots.

12. The apparatus as recited in claim 1, wherein said handle comprises flat surfaces for gripping.

13. An apparatus consisting of:
  means for handling food during a cooking process;
  means for supporting said handling means, wherein said supporting means is coupled to said handling means;
  means for moving said handling means, wherein said moving means is disposed proximate a distal end section of said supporting means to support said handling means;
  means for contacting food and for enabling a pressure to be applied to food, wherein said contacting means is disposed approximately across said handling means;
  means for attaching the contacting means, in which said attaching means extends to, and coupled with, said contacting means, wherein said supporting means is disposed proximate a middle portion of said attaching means, and wherein said attaching means is configured to substantially prevent a sideways movement of said supporting means, thereby preventing a sideways movement of said contacting means relative to said handling means;
  means for imparting a relative downward movement of said contacting means, in which said imparting means extends from said attaching means and disposed at a proximate distal curved end section of said attaching means, wherein said imparting means is substantially engaged to said moving means configured to anchor said imparting means to said moving means, in which said imparting means is configured to apply pressure to food; and
  means for enabling said contacting means to be retained in an open position relative to said handling means, and for returning said contacting means to said open position from said relative downward movement of said contacting means.

14. An apparatus comprising of:
  a spatula surface portion, wherein said spatula surface comprising a generally flat rectangular surface with a straight front edge, curved left and right edges, and plurality of oblong slots, in which said spatula surface being configured for handling food during a cooking process;
  a spatula arm portion, said spatula arm comprising at least one spatula arm, wherein said spatula arm extends from the spatula surface and configured to support the spatula surface during the cooking process, the spatula arm having a generally curved shape where an end portion of the arm, is at a proximate raised position relative to the spatula surface;
  a handle portion, said handle portion comprising at least one handle, wherein said handle extends from said spatula arm and disposed at a distal end portion of the spatula arm, in which said handle is configured to enable a user to move the spatula surface to engage food during the cooking process, and in which the handle further comprising flat surfaces for gripping by a user;
  a drainer segment, wherein said drainer segment is generally disposed across a top surface of the spatula surface for contacting food positioned between the spatula surface and the drainer, in which the drainer comprising a grid pattern for contacting the food, and in which said drainer further comprising curved left and right edges configured to approximately match curved edges of the spatula surface;
  an attaching bar segment, wherein said attaching bar segment comprising at least two bar segments extending to, and coupled with, said drainer, and wherein said spatula arm is disposed proximate a middle portion of said at least two bar segments, in which said at least two bar segment is configured to substantially prevent a relatively sideways movement of the spatula arm, thereby preventing a sideways movement of said drainer relative to the spatula surface, where a proximate end section of the attaching bars, distal to the drainer, is disposed above a proximate end section of the arm;
  a lever, said lever comprising at least one lever, wherein said lever is disposed at an end portion of the attaching bar, in which said lever is coupled proximate a distal end of the handle, and in which said lever is configured to enable a user to substantially impart a relative downward movement of the drainer, by applying a downward pressure on the lever, to apply the pressure to the food; and
  means for enabling the drainer to be retained in an open position relative to said spatula surface, and for returning the drainer to the open position from said relative downward movement of said drainer.

* * * * *